(12) United States Patent
Harrison et al.

(10) Patent No.: US 6,754,475 B1
(45) Date of Patent: Jun. 22, 2004

(54) TRANSMISSION PERFORMANCE MEASUREMENT AND USE THEREOF

(75) Inventors: Robert Mark Harrison, Grapevine, TX (US); Kamyar Rohani, Kellert, TX (US); Srikanth Gummadi, Rohnert Park, CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/185,974

(22) Filed: Jun. 28, 2002

(51) Int. Cl.[7] .................................................. H03C 1/62
(52) U.S. Cl. ...................... 455/115.1; 455/69; 455/424; 455/562.1
(58) Field of Search ............................. 455/69, 115.1, 455/115.3, 115.4, 504, 522, 561, 562.1, 67.11, 67.13, 277.1, 423, 424; 370/342, 345, 347, 252

(56) References Cited

U.S. PATENT DOCUMENTS

| | | | | |
|---|---|---|---|---|
| 5,574,984 A | * | 11/1996 | Reed et al. | 455/69 |
| 5,710,977 A | * | 1/1998 | Nakazawa | 455/65 |
| 5,724,666 A | * | 3/1998 | Dent | 455/562.1 |
| 5,970,061 A | * | 10/1999 | Kokudo | 455/67.13 |
| 6,067,324 A | | 5/2000 | Harrison | 375/267 |
| 6,556,845 B1 | * | 4/2003 | Ide et al. | 455/277.1 |

* cited by examiner

Primary Examiner—Quochien B. Vuong
(74) Attorney, Agent, or Firm—Posz & Bethards, PLC; Charles W. Bethards (57) ABSTRACT

A method for and wireless communications unit adapted for measuring transmission performance for a signal emanating from an antenna is discussed. The wireless communications unit includes a receiver for receiving the signal in a first and a second time interval to provide, respectively, a first and a second signal; and a channel processor for assessing a relative channel metric corresponding to the first and second signal, the relative channel metric indicative of the transmission performance of a transmission mode. A corresponding method and base transmitter is also arranged and adapted for adjusting a transmission mode based on measured transmission performance and includes a transmitter for sending the signal in the first and second time interval and a base channel processor for determining a channel metric corresponding to the first and second signal, the channel metric indicative of the transmission performance; the transmitter further sending a control signal corresponding to the transmission mode adjusted according to the transmission performance.

32 Claims, 5 Drawing Sheets

TRANSMISSION PERFORMANCE MEASUREMENT AND USE THEREOF

FIELD OF THE INVENTION

This invention relates in general to communication systems, and more specifically to a method and apparatus for assessing transmission performance and using the performance to select a transmission mode.

BACKGROUND OF THE INVENTION

A frequent goal in designing wireless communications systems is to increase the number of users that may be simultaneously served by the communications system. This may be referred to as increasing system capacity. In multiple access communications systems, including code division multiple access (CDMA) wireless communications systems, the use of adaptive antenna arrays at the base transceiver has been proposed as a method of increasing system capacity.

An adaptive array antenna includes two or more radiating elements with dimensions, spacing, orientation, and an illumination sequence that produce a field from a combination of fields emitted from individual elements that has greater intensities in some directions and lesser field intensities in other directions. An adaptive array antenna assists in increasing system capacity because this field pattern or radiation pattern of the adaptive array antenna, which includes multiple beams or lobes, may be configured such that signals intended for a selected user are in higher-gain antenna lobes pointed in the direction of a selected user, while nulls in the antenna pattern are likely directed to other users. Thus, signals intended for other users in the selected user's antenna null are not adversely affected by the power intended for the selected user. This increases capacity because one user's signals are not transmitted with a higher antenna gain to all the other users in the sector or cell where it would degrade all other users' signals. Other transmission modes such as higher data rates, for increasing system capacity have also been considered.

Unfortunately these various transmission modes or techniques have limitations reflected in varying levels of transmission performance. These limitations and resultant transmission performance are typically related to and can be modeled as functions of channel quality and reliability. For example, a wireless channel can vary dramatically from location to location and will depend on whether the source and target are in relative motion each to the other. Most adaptive array antenna systems and transmission modes using adaptive arrays utilize some form of algorithm, often mobile assisted, to quasi-continually adapt the array to current channel conditions e.g. mobile or portable subscriber position and relative motion in order to maintain or optimize transmission performance. Similarly higher data rate systems tend to be adaptive and require some form of adaptation to current channel conditions. However, the ability of these systems to adapt to changing channel conditions is limited by transport and processing times as well as bandwidth devoted to the adaptation of the system and once this limit is exceeded the systems tend to perform very poorly.

Thus, it should be apparent that a need exists for a method and apparatus for measuring transmission performance and using such measurements for such activities as selecting appropriate transmission modes.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENTS

In overview form the present disclosure concerns communications systems that provide service to communications units or more specifically user thereof operating therein. More particularly various inventive concepts and principles embodied in methods and apparatus for the measurement of transmission performance and use of such measurements to make and effect transmission mode decisions are discussed and described. The communications systems of particular interest are those being deployed and developed such as GSM, GPRS, CDMA, IDEN, 2.5G, and 3G systems that use modulation formats such as QPSK, DQPSK, OQPSK, BPSK, QAM, and spread spectrum or variations and evolutions thereof that are suitable for or use adaptive antenna arrays or alternative transmission modes such as variable data rate complex modulation techniques. As further discussed below various inventive principles and combinations thereof are advantageously employed to measure transmission performance and adjust transmission modes in accordance therewith, thus alleviating various problems associated with known systems while still facilitating large system capacities when appropriate, provided these principles or equivalents thereof are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions or integrated circuits such as field programmable logic arrays and application specific integrated circuits. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits with minimal experimentation. Therefore further discussion of such software and integrated circuits, if any, will be limited in the interest of brevity and minimization of any risk of obscuring the principles and concepts in accordance with the present invention.

Figure 1:
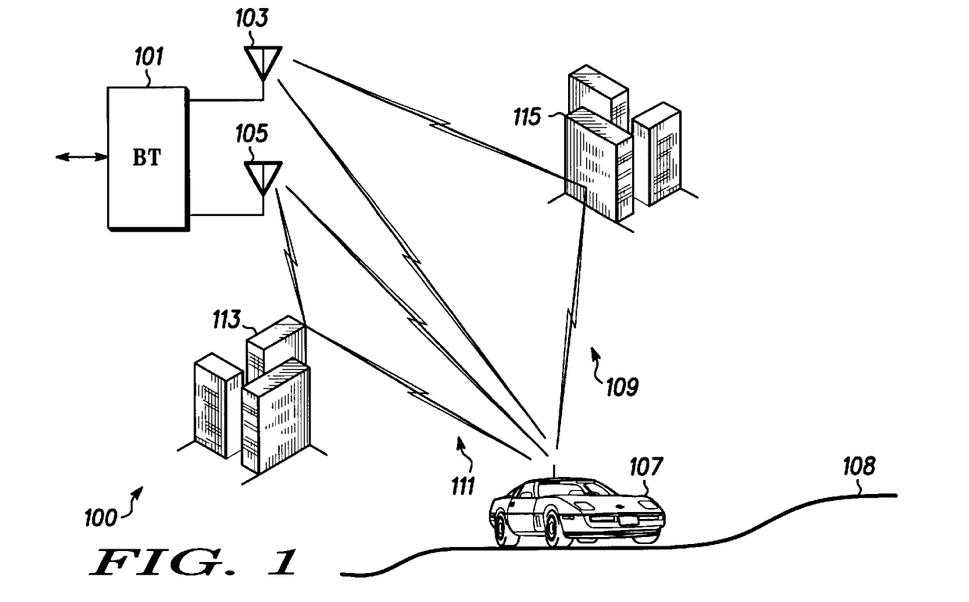
FIG. 1 depicts, in a simplified and representative form, a block diagram of a communications system suitable for using an embodiment in accordance with the present invention.

Referring to FIG. 1, a simplified and representative block diagram of a communications system 100 suitable for using an embodiment according to the present invention will be reviewed. FIG. 1 depicts a base transmitter 101, such as a base transceiver system for a cellular system available from manufacturers such as Motorola, employing a transmit antenna array including two antenna elements 103, 105 to communicate with a wireless communications or subscriber or selective call unit 107, such as a cellular phone, that is mobile and travels along a route 108. Signals from antenna element 103 are transmitted or radiated over a channel 109 and signals emanating from antenna element 105 are transported over a channel 111. By observation each channel in this exemplary diagram is comprised of a plurality of paths from the radiating antenna element to the wireless communications unit, specifically as depicted a direct path and a path that is reflected from an obstacle 113, 115 such as building, geological structure, or the like. Note that often the composite of all paths from all antenna elements to a receive antenna system will be called and designated a channel or composite channel. When it is relevant we will seek to differentiate a channel and a composite channel herein and when not so distinguished either explicitly or implicitly a channel can be viewed as a composite channel.

By using an adaptive antenna array and particular weights for each element these channels can be optimized or at least improved for communications with the wireless communications unit. As the wireless communications device moves along the route 108 the channels will vary or change dramatically due in part to the characteristics of the movement and in part to encountering different obstacles and thus paths. At different locations along the route 108 the adaptive antenna array will need to be adapted by changing weights (relative gains and phases) to correlate with the available and changing channels in order to continue to provide service to the wireless communications unit. This may be done by sending a signal having known characteristics, assessing what is received, then reporting this information in a raw or processed form to the originator and taking action to adapt the antenna array responsive thereto. The rate at which the channel or channels change is largely a function of the relative velocity between the wireless communications unit and the base transmitter. At some velocity it is likely that the channel changes will occur so rapidly that the performance of the above technique for adapting the antenna array to the available channels will be degraded.

In that case a different transmission mode is often indicated. An important aspect according to the principles and concepts herein disclosed is a methodology and mechanism for making a determination based on measured transmission performance of when such a transmission mode change is indicated. Various combinations of measurement, processing, decision making and implementation thereof as divided for example between the base transmitter and the wireless communication unit will be reviewed.

While the method and the following exemplary apparatus may be described with primary reference to a code division multiple access (CDMA) communications system, such as IS-95, CDMA 20000, 2.5G, 3G or W-CDMA, it should be understood that the invention is applicable to numerous communications systems utilizing various multiple access schemes additionally including, but not limited to, frequency division multiple access (FDMA) and time division multiple access (TDMA) systems, such as global system mobile (GSM) and GPRS systems. Furthermore, while reference will be made to a base transceiver or transmitter and a wireless communications or subscriber unit, it should be understood that the invention is applicable to any adaptive array system in which a receiver processes a channel, preferably using or with reference to a signal as a reference. The mobile or subscriber unit may utilize an antenna or adaptive antenna array as well as the base, mobiles may communicate with each other, etc. Finally, the discussions of the preferred embodiments will largely refer to a single receive antenna case, although the invention is applicable with any number of receive antennas.

Figure 2:
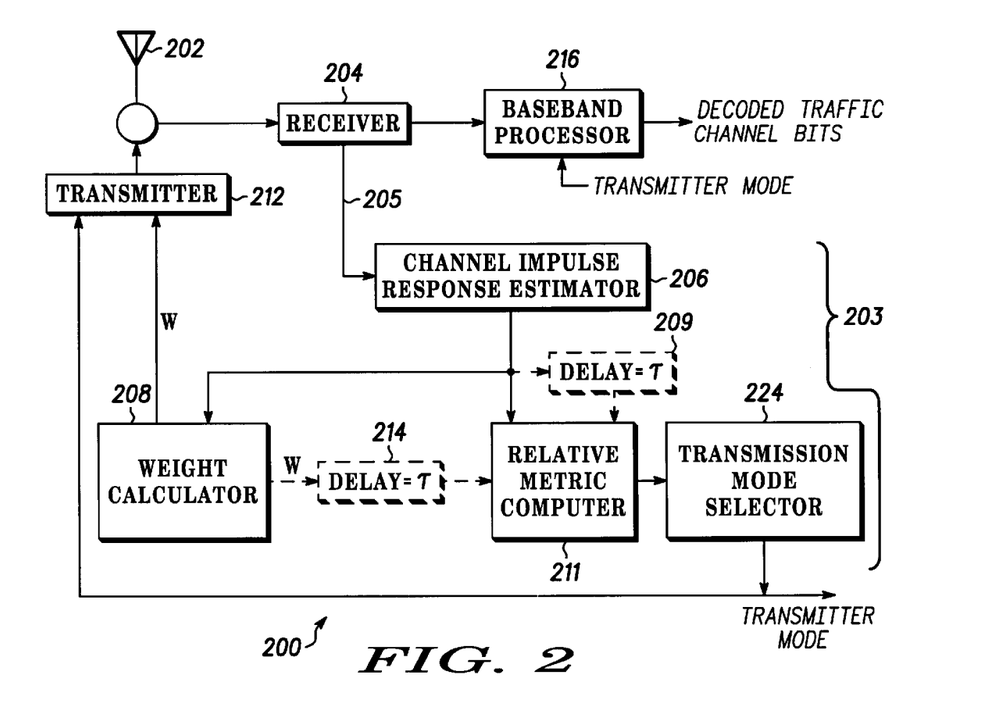
FIG. 2 depicts a block diagram of a preferred embodiment of a wireless communications unit according to the present invention.

Referring to FIG. 2 a block diagram of a preferred embodiment of a subscriber unit or wireless communications unit (WCU) 200 will be described and discussed. As may be appreciated from the foregoing description, numerous embodiments and variations of the present invention are available. For example, a preferred exemplary CDMA based embodiment of the present invention may be implemented in the WCU 200 as shown in FIG. 2. Generally this is a known CDMA transceiver that is widely available, however this transceiver has been adapted and modified according to the inventive principles and concepts discussed and disclosed herein. Thus much of the known functionality will be discussed if at all only in passing with the majority of our time devoted to the inventive principles and concepts according to the present invention. The WCU includes: an antenna 202 that couples received radio frequency energy to a receiver 204 that amplifies, filters, and converts the radio frequency to base band and couples a base band signal at terminal 205 to a channel processor 203 and a base band traffic signal to a base band processor 216. The base band processor 216 determines channel traffic bits from the base band signal by performing despreading, rake combining or equalization, demodulation and decoding functions as are known except that this base band processor is responsive to the transmission mode that is selected. The channel processor 203 includes a channel impulse response estimator 206, a weight calculator 208, and a relative metric computer 211. The channel impulse response estimator 206 is coupled to the base band signal 205 and provides a channel impulse response estimate, preferably a vector representation, (for the channel extending, for example, from the antenna elements of the antenna array at the base site to the subscriber unit) to the weight calculator 208 and the relative metric computer 211.

Figure 3:
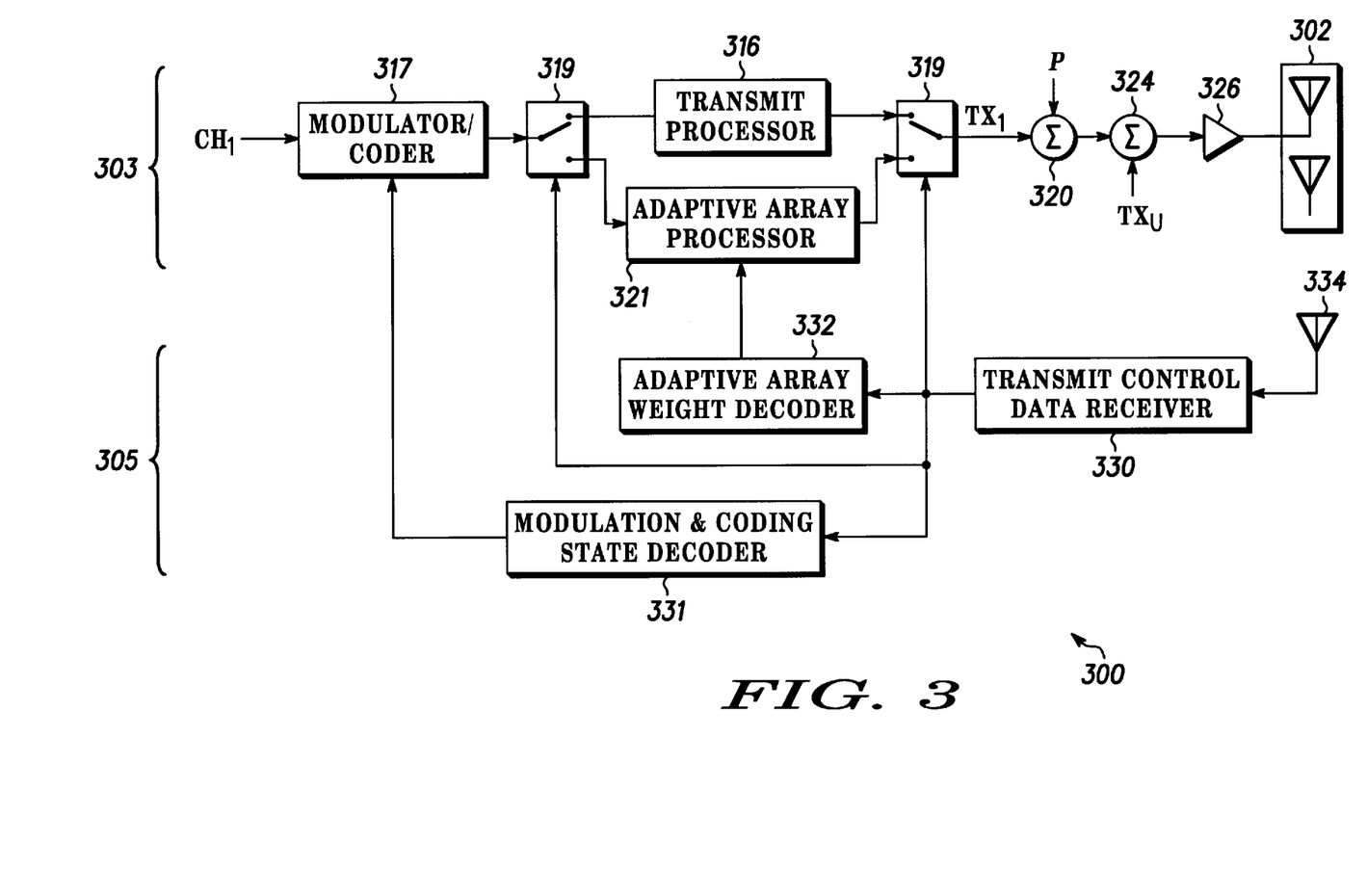
FIG. 3 depicts a block diagram of a preferred embodiment of a base transmitter in accordance with the present invention.

The weight calculator 208 determines array weights for an adaptive antenna array 302, located at the base station 300 (described below), from the channel impulse responses provided by the impulse response estimator 206. For each time instant or interval, such as a time slot in CDMA systems, the array weights are provided to the transmitter 212 for transmission or sending to the base transceiver as an information signal corresponding to a relative channel metric. Note that in certain embodiments of the wireless communications unit or subscriber device the weight calculator will not be required and even if otherwise required the weights will not be sent to the transmitter. The adaptive array weights are typically selected to maximize the received signal to interference plus noise ratio (SINR). The SINR resulting from a selection of adaptive array weights is dependent on the receiver used, most particularly on what kind of equalization is used.

If we assume that a multipath combining receiver is used (such as the RAKE receiver commonly used in CDMA systems, which is described in pp. 729–739 of Proakis, *Digital Communications*, Second Edition, McGraw-Hill publishing, 1989), the received signal (measured at the combiner output) at the mobile may be modeled during a single symbol time as:

$$r = \sqrt{p_t}\, b v^H H w + n \qquad \text{Equation 1}$$

Where:

M is the "number of receive paths": the number of taps in the channel impulse response for all antennas at the receiver. It is common to use the same number of taps for each antenna, so if there are L receive antennas and K taps needed to characterize the channel impulse response, M=KL. The discussions of the preferred embodiments will refer to the single receive antenna (L=1) case, although this and all following equations are applicable with any number of receive antennas.

N is the number of transmit coefficients. Non frequency selective adaptive arrays will have 1 coefficient per element, so N is the number of antenna elements in this case. When frequency selective adaptive arrays are used, N will be greater than the number of elements.

b is the traffic channel symbol (a complex scalar)

$p_t$ is the average transmitted traffic channel power w is an N element column vector containing the adaptive array weights. This vector is what is described by the transmitter control data.

v is an M element column vector containing the multipath combining weights used at the receiver. Note that when more than one antenna is used at the receiver, both paths and antenna outputs are combined.

H is a matrix with M rows and N columns containing the channel impulse response from each element of the antenna array to each antenna element of the mobile station.

n is the M×1 column vector of noise samples, 1 element for each multipath tap on each receive antenna.

$x^H$ is the complex conjugate transpose of the variable x.

When a RAKE receiver is used, the multipath combining weights are:

$$v = \Sigma^{-1} H w \qquad \text{Equation 2}$$

Where:

$\Sigma^{-1}$ is the matrix square root of the inverse of the noise autocorrelation matrix. The noise correlation matrix is: $\Sigma^2 = E\{nn^H\}$. RAKE receivers typically assume the noise is uncorrelated, and which means it is a diagonal matrix containing the noise power on each path along the diagonal, and zeros elsewhere.

$E\{x\}$ is the expected value of the variable x.

If we assume that the transmitted symbol, b has unit magnitude, the received power after RAKE combining at the mobile may be expressed:

$$\rho_r = p_t \frac{w^H H^H H w}{w^H \Sigma^2 w} \qquad \text{Equation 3}$$

Where:

$\rho_r$ is the "instantaneous received SINR" at the mobile. Systems using feedback based adaptive arrays commonly have a finite number of possible array weight vectors w. These systems generally select the available vector w that maximizes $\rho_r$.

The array weights w determined by weight calculator 208 are provided to delay 214 that provides the delayed weights to relative channel metric computer 211 as a first channel metric. The current channel estimates from channel impulse response estimator 206 are also provided to relative metric computer 211, and used as a second channel metric. Given these two metrics, the relative channel metric computer 211 determines the performance of the adaptive array or more specifically a change in the channel from one time period to another thus providing a relative channel metric indicative of the transmission performance of a transmission mode.

In a first preferred embodiment, relative metric computer 211 determines the signal to interference and noise ratio the mobile 200 would receive when delayed weights from delay 214 are used at the current time slot on the channel (whose estimate is provided by channel response estimator 206).

We may express the operation of Relative metric computer 211 as a slight modification of equation 3:

$$\rho_d = p_t \frac{w(t-\tau)^H H(t)^H H(t) w(t-\tau)}{w(t-\tau)^H \Sigma^2 w(t-\tau)} \qquad \text{Equation 4}$$

Where:

H(t) is the channel at the current time instant t $w(t-\tau)$ is the array weight vector computed for a previous time instant $t-\tau$ $\rho_d$ is the estimated delayed SINR at the mobile relative metric computer 211

In a second embodiment, Relative metric computer 211 computes an additional SINR value representative of an alternative transmission mode. One such alternative transmission mode is open loop transmit diversity meaning that the antenna array is no longer adapted based on time slot by time slot feedback. When open loop transmit diversity is used, the estimated received SINR may be expressed:

$$\rho_o = p_t \frac{tr(H(t)^H H(t))}{\sigma^2}$$

Where:

$\rho_o$ is the estimated received power from open loop diversity transmission tr(X) is the sum of the diagonal elements of the matrix X $\sigma^2$ is the noise power received at the mobile station.

When more than one antenna is used at the mobile, it is possible to simultaneously receive multiple data channels in the same frequency spectrum using multiple-input multiple-output antenna arrays. Such systems are known in the art, (see for example G. G. Raleigh, J. M. Cioffi, "Spatio-Temporal Coding for Wireless Communication", pp. 357–366, IEEE Transactions On Communications, Vol. 46, No. 3, March 1998). In this case, the mobile may evaluate the performance of each of the channels independently using a modified version of equation 4:

$$\rho_{r,i} = p_{t,i} \frac{w_i(t-\tau)^H H(t)^H H(t) w_i(t-\tau)}{w_i(t-\tau)^H \Sigma^2 w_i(t-\tau)} \qquad \text{Equation 6}$$

where:

H(t) is the channel at the current time instant t. It contains a total of M rows. As discussed above the rows are grouped K at a time, and each of these groups is associated with one of L antennas. The matrix has N columns, corresponding to the N transmit coefficients.

$w_i(t-\tau)$ is the array weight vector computed for a previous time instant $t-\tau$ for data channel i. The weight vectors may be computed to maximize power for each data stream independently, as was described above for the single channel case with reference to equation 3.

$p_{t,i}$ is the average transmitted power for data channel i $\rho_{r,i}$ is the estimated delayed SINR at the mobile by Relative metric computer 211 for data channel i The mobile may also receive more than one traffic channel at a given instant in cases other than the MIMO (Multiple Input Multiple Output) case. For example, the base may transmit to the mobile on different frequencies, different Walsh codes, or at different time instants. In these cases equations 4 and 5 may be applied to each of the data channels, producing different SINR values for each data channel.

It is also possible to evaluate the performance of an antenna array in the presence of delay by directly examining the time variation of a channel. In this case, the adaptive array weights produced by weight calculator 208 are not used in relative metric computer 211, and delay 214 is not used. Relative metric computer 211 uses the delayed channel estimate from delay 209 as a first channel metric. It then uses the current channel estimate from channel estimator 206 as a second channel metric. The relative channel metric then compares the variation of the channel between the two time instants represented by the two metrics. A preferred way to compute the relative channel metric is to compute a phase difference between the channel estimates at the two time instants. This can be expressed as:

$$\Delta_\phi = \arg(h_{max}(t)) - \arg(h_{max}(t-\tau))$$ Equation 7

Where:

$\Delta_{100}$ is the computed phase difference between the two channel estimates.

$\arg(x)$ is the angle of the complex number x $h_{max}(t)$ is the element of the channel matrix H(t) with maximum magnitude.

When $\Delta_\phi$ is large, there is rapid variation in the channel. When this variation is too large, an adaptive array will poorly track the channel, resulting in degraded performance. Therefore, $\Delta_\phi$ may be used as a relative channel metric.

The relative channel metric information is provided to transmission mode selector 224, Transmission mode selector 224 selects a suitable transmission mode given the performance of the adaptive antenna array determined in relative metric computer 211. In the first preferred embodiment, a modulation and coding state that can be supported given the SINR, $\rho_d$, is selected. In the second preferred embodiment, the transmit antenna array methodology is selected by comparing the estimated performance of varying transmission methods or modes, such as closed loop diversity (adaptive diversity) or open loop diversity. This may be done by selecting adaptive array transmission mode if $\rho_d$ is greater than $\rho_o$ by a predetermined amount. The modulation and coder state may then be selected based on the transmission method selected. That is if adaptive array transmission is selected, the modulation and coder state would be selected based on $\rho_d$, and if open loop transmission were selected, the modulation and coder state would be selected based on $\rho_o$.

Example modulation and coder states (MCS) are shown below. Here, 4- and 16-QAM (Quadrature Amplitude Modulation) are used, with varying error correction code rates "R". The number of information bits transmitted after coding and with the selected modulation is also shown. An MCS is selected if the SINR falls within the range shown.

| MCS Table | | |
|---|---|---|
| MCS Level | SINR Range (dB) | Information Bits per Transmitted symbol |
| R = 1/4, 4QAM | $-\infty < \rho < 0.5$ | 1/2 |
| R = 1/2, 4QAM | $0.5 < \rho < 4.0$ | 1 |
| R = 3/4, 4QAM | $4.0 < \rho < 5.5$ | 3/2 |
| R = 1/2, 16QAM | $5.5 < \rho < 8.0$ | 2 |
| R = 5/8, 16QAM | $8.0 < \rho < 10$ | 5/2 |
| R = 3/4, 16QAM | $10 < \rho < \infty$ | 3 |

Referring to FIG. 3 a block diagram of a preferred embodiment of a base transmitter 300 will be described and discussed. As may be appreciated from the foregoing discussions, numerous embodiments and variations of the present invention are available. For example, a preferred exemplary CDMA based embodiment of the present invention may be implemented in the base transmitter 300 as shown in FIG. 3. Generally this is a known CDMA base transceiver that is widely available, however this transceiver has been adapted and modified according to the inventive principles and concepts discussed and disclosed herein. Thus much of the known functionality will be discussed if at all only in passing with the majority of our time devoted to the inventive principles and concepts according to the present invention. The base transmitter 300 is arranged and adapted for adjusting a transmission mode based on measured transmission performance for a signal emanating from antenna array 302. The base transmitter 300 includes a transmitter 303 for sending the signal in a first time interval and in a second time interval to provide, respectively, a first signal and a second signal at for example a receiver, and a base channel processor 305 for determining a channel metric corresponding to said first signal and said second signal, said channel metric indicative of the transmission performance. In one aspect the transmitter 303 will send a control signal corresponding to the transmission mode wherein the transmission mode is adjusted according to the transmission performance.

The base transmitter 300 in the simplified form shown begins with the base channel CH1 as an input to modulator/coder 317. Modulator/coder 317 is arranged and constructed to modulate and code the base channel signal in one of a plurality of states, such as such as the exemplary MCS table shown above, and certain of these states may be selected by the state decoder 331. Changing the state of the modulator/coder is one way to adjust the transmission mode of the base transmitter 300. The output from the modulator/coder 317 is routed to a first of two switches 319 that are controlled via the output of a control data receiver 330 to route the modulated and coded signal through a conventional transmit processor function 316 or an adaptive array processor 321. The conventional transmit processor function 316 may be a filtering arrangement with characteristics established by specifications for the particular communications service or characteristics established from time to time by channel characteristics. Typically if the base transmitter is operating in open loop diversity mode the signal will be routed through the conventional transmit processor 316.

The adaptive array processor 321 is a complex valued filter with variable gain and phase coefficients that will result is varying portions of power being radiated in different directions from the antenna array 302 as is known. By adapting the array on a quasi-continuous basis a signal with better signal to interference can be presented to a receiver as the path to that receiver varies. This may be referred to as closed loop diversity operation as is known. When the channel variation is faster than the adaptive arrangement can keep up with, the system may experience performance degradation. Adjusting between open loop and closed loop diversity operation is another approach to adjusting from one to another transmission mode. The output from the second switch 319 is the base band transmit signal and this is applied to a summer 320 where, for CDMA systems, a pilot signal is added and the result is applied to a second summer where other base band transmit channel signals are added. The composite signal is applied to an output stage 326 the upconverts the base band signal to a radio frequency signal, filters and amplifies the radio signal and applies the filtered and amplified radio frequency signal to the antenna array 302.

Further included in the FIG. 3 embodiment is the base band processor 305 that includes a transmit control data receiver 330 with an input coupled to an antenna 334 and an output coupled to an adaptive array weight decoder 332, the modulation and coding state decoder 331 and a control input for the two switches 319. The antenna 334 may be separate from or part of the antenna array 302. This embodiment demonstrates a more of a passive embodiment of the base band processor 305 and thus base transmitter that is arranged for adjusting the transmission mode. A more active embodiment will be discussed later with reference to FIG. 5. In overview the base transmitter of FIG. 3 is intended to operate with the wireless communications unit of FIG. 2 and in a preferred form the data receiver 330 will receive an information signal from the wireless communications unit or subscriber unit that corresponding to the first signal and the second signal (signals in successive time slots for example) and from this information signal the base channel processor 305 or more specifically the data receiver 330 will further determine a relative channel metric based on the information signal. Note in practice this may be as simple as receiving a code corresponding to a desired one of a few array patterns or a code corresponding to one of a few modulation and coding states. This information would be passed to the respective decoders 332, 331 and the decoders would implement any resultant changes. The base transmitter 300, responsive to any changes, may send a control signal that corresponds to the new transmission mode and this control signal will likely include a predetermined control component such as user specific pilot signals transmitted from distinct elements in antenna array 302. The user specific pilot signals may be altered in a predetermined manner to indicate the transmission mode, including the type of antenna array transmission used. In a preferred embodiment, two distinct user specific pilots (composed of distinct signals) are transmitted when open loop diversity is used. When closed loop diversity is used, a single pilot is transmitted on both antennas. The absence of two distinct pilots can be detected by the mobile, and the mode of transmission may therefore be determined by the mobile. The control signal alternatively may be a predetermined communication signal transmitted on a control channel to the mobile. This control signal would identify to the subscriber unit when the transmission mode has changed. Alternatively the subscriber can presume that a change will be implemented within two slots after the information signal has been sent to the base transmitter.

In operation the wireless communications unit 200 or subscriber device is adapted, arranged and constructed for measuring transmission performance for a signal emanating from an antenna, preferably an antenna array such as 302. The wireless communications unit includes the receiver 204, etc. for receiving the signal in a first time interval and in a second time interval, such as a first and second time slot in a CDMA system, to provide, respectively, a first signal and a second signal. Further included is the channel processor 203 for assessing a relative channel metric corresponding to the first signal and the second signal, where the relative channel metric is indicative of the transmission performance of a transmission mode by which the signal was transmitted.

The channel processor 203 in one embodiment will compare the relative channel metric to a threshold to provide a comparison and based on or responsive to this comparison the transmitter 212 will send an information signal corresponding to the transmission mode or new mode. For example if the metric computer 211 determines from the calculations noted above that the open loop power is greater than the closed loop power by comparing one to another the transmission mode selector 224 would indicate that open loop diversity is the proper choice and this would be conveyed to the base transmitter via the transmitter 212 and data receiver 330 and the switches 319 would be adjusted to route the base band signal through the conventional transmit processor 316. Thus the wireless communications unit or transmitter sends an information signal corresponding to the relative channel metric and from the discussion above the receiver at the wireless communications unit can receive a control signal corresponding to another transmission mode wherein the transmission mode is adjusted according to the transmission performance. The control signal will preferably include a predetermined control component as described above.

From the discussions above it should be evident that the channel processor in its attempts to assess, calculate, or otherwise determine a metric or relative channel metric has a number of options available including for example assessing or measuring a phase difference between a first and a second channel emanating from, for example a first and a second element of the antenna or form the array at two different times such as the first and second time interval or determining a first and a second adaptive array weights for, respectively, the first time interval and the second time interval or determining a metric corresponding to adaptive array weights for the first time interval and an alternative transmission mode such as one of a non-adaptive transmit antenna array, a single transmit antenna, and a multiple input multiple output antenna arrangement. Note also that the metrics noted here or decisions regarding a transmit mode may well correspond to the number of information bits within one time interval and optionally as compared to the number in another interval. When the MCS states are adapted, each will provide a different information rate, as shown by the number of information bits per transmitted symbol in the MCS table above. The expected information bit rate may be computed for each MCS state based on the number of information bits per transmitted symbol and the expected error rate (which may be computed from the SINR and MCS state using known methods). The selected technique will be the one that provides the maximum information bit rate through all data streams.

Figure 4:
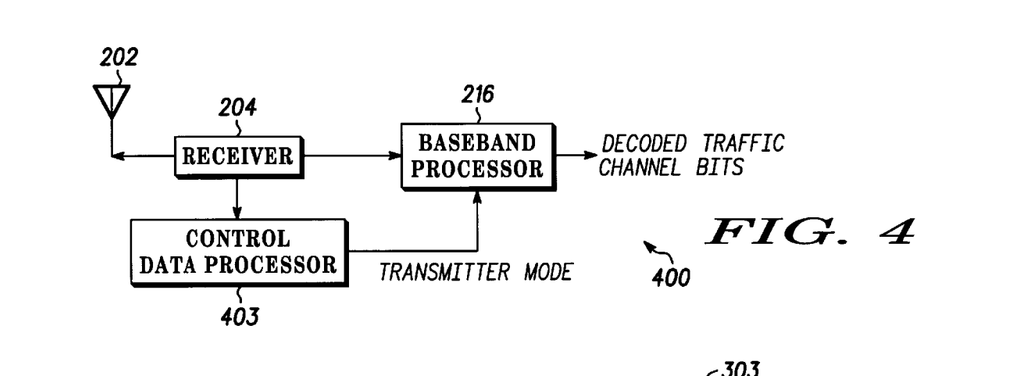
FIG. 4 depicts a block diagram of an alternative preferred embodiment of a wireless communications unit according to the present invention.

Above we have discussed the FIG. 2 wireless communications or subscriber unit and the FIG. 3 base transmitter unit. These block diagrams are representative of a subscriber unit that takes an active role making the basic channel measurements and transmission mode decisions while the base transmitter takes a more passive role essentially being informed of and then implementing the transmission mode decisions. We will now discuss a passive subscriber with reference to FIG. 4 and an active base transmitter with reference to FIG. 5. Referring to FIG. 4, a block diagram of an alternative embodiment of a wireless communications or subscriber unit 400 will now be discussed and described. This subscriber unit 400 includes the antenna 202, receiver 204, and baseband processor 216 all inter-coupled and operating as above discussed.

The receiver 204 couples signals to a channel processor or more specifically a control data processor 403. The processor 403 is arranged and constructed and operates in one aspect to identify an express code that selects or corresponds to a given transmission mode and directs the base band processor 216 at the proper time as to the proper transmission mode corresponding to this code. In another aspect the data processor 403 will detect a change in a control component of a control signal, such as for example a power level change in a pilot signal and this change will indicate a change in the transmission mode. For example, transmitting two user specific pilot signals for a given time interval can indicate that open loop rather than closed loop diversity is going to be used for the transmission mode and vice-a-versa. Note that while the processor 403 is shown separate from the baseband processor 216 is may be appropriate and some cases preferred that they are implemented in the same digital signal processors and the like as some of the functions, such as pilot signal power here attributed to the data processor 403, are likely already being performed for other purposes by the baseband processor. Also it is assumed that the wireless communications unit includes a transmitter (not shown) for purposes of transmitting normal user traffic to the base transmitter.

Figure 5:
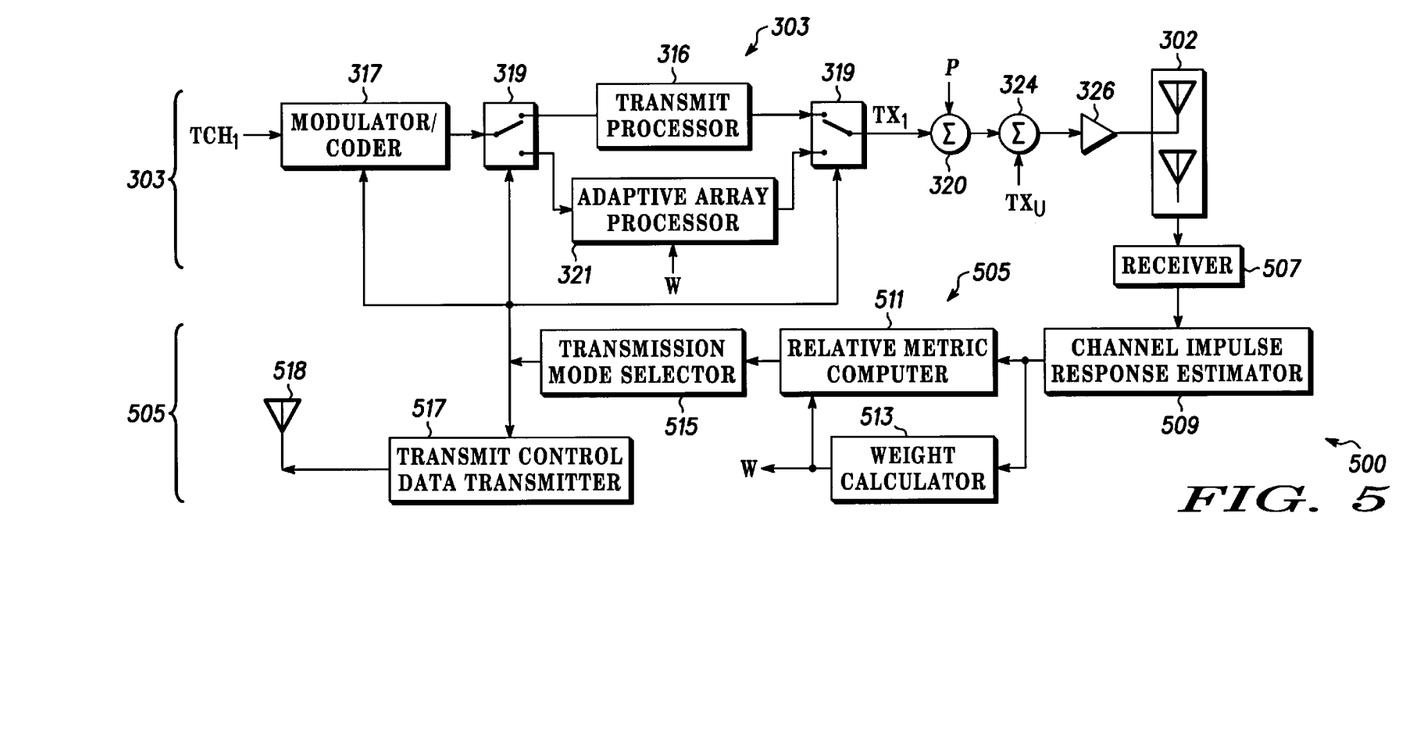
FIG. 5 depicts a block diagram of an alternative preferred embodiment of a base transmitter in accordance with the present invention.

Referring to FIG. 5 a block diagram of an alternative embodiment of a base transmitter 500 will be discussed and described. The base transmitter is arranged and adapted for adjusting a transmission mode based on measured transmission performance for a signal emanating from an antenna. The base transmitter 500 includes the transmitter 303 including the elements (317, 319, 316, 321, 320, 324, 326 and 302), depicted inter-coupled and operating as discussed with reference to FIG. 3 above. The transmitter 303 sends the signal in a first time interval, in a second time interval, and etc. to provide, respectively, a first signal, a second signal, etc. The base channel processor 505 includes most or many of the functional blocks that were depicted and described with reference to the channel processor of FIG. 2. Furthermore a receiver 507 is shown coupled to one or more elements of the antenna array 302. This receiver will be receiving a signal from the wireless communications unit on the uplink frequency at or as near to the first and second etc. time intervals as practical. It is known that the outbound or downlink channel and the inbound or uplink radio frequency channels have statistical properties that are reasonably well correlated and thus by measuring the inbound channel characteristics reasonable decisions regarding the outbound channel and appropriate transmission modes therefore can be made.

Essentially the various elements of the base channel processor operate as discussed above with reference to wireless communications unit block diagram of FIG. 2. For example the receiver 507 couples the received signal to the channel impulse response estimator 509 where an impulse response estimate for each time interval is formed. This estimate is used to develop the antenna array weights (applied to the adaptive array processor 321) at the weight calculator 513 and relative metrics at the metric computer 511 as discussed above. The relative metrics are analyzed and used at the transmission mode selector 515 to select a transmission mode and the various controllable portions of the transmitter are controlled to implement the chosen transmission mode as noted above. The transmission mode may also be coupled to the control data transmitter 517. This transmitter may be utilized for forwarding or sending to the subscriber unit via antenna 518 (antenna 518 may be a separate antenna or a portion of the antenna array 302) a control signal corresponding to the transmission mode wherein the transmission mode has been adjusted according to the transmission performance that was measured.

Note that the receiver 507 may be arranged for receiving an information signal from the wireless communications unit, such as channel impulse response estimates or array weights corresponding to the first signal and the second signal and the base channel processor can then determine a relative channel metric based on the information signal, compare the relative channel metric to a threshold (for example compare open loop signal power to closed loop power and when the open loop power is greater revert or rearrange the system to use open loop diversity) to provide a comparison and then the transmitter either 303 or 517 can send a control signal corresponding to a newly selected transmission mode. Regardless the base channel processor has various options for determining the channel metric, such as a metric corresponding to a phase difference between a first and a second channel emanating from the antenna 302 or a metric corresponding to adaptive array weights for the first time interval and the second time interval, or the metric may correspond to adaptive array weights for the first time interval and an alternative transmission mode such as using the antenna as one of a non-adaptive transmit antenna array, a single antenna, or a multiple input multiple output antenna. The metric can correspond to a number of information bits (MCS selection) within the first, second, and so on time intervals or simply a change in the impulse response estimates from time interval to time interval. As discussed above the base transmitter using the receiver 507 can receive a third signal and determine the channel metric by measuring the third signal.

Figure 6:
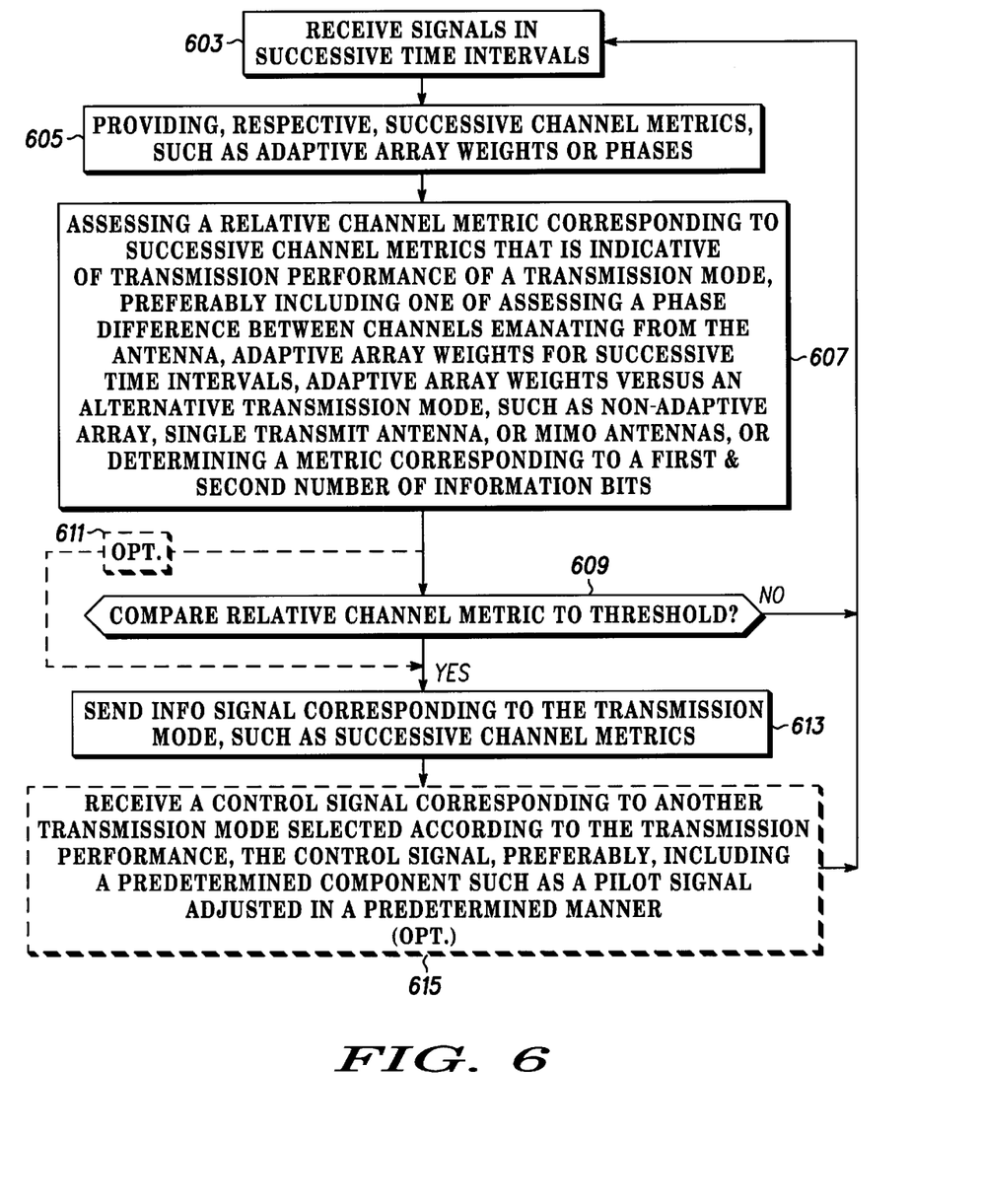
FIG. 6 depicts a flow chart of a preferred method of measuring transmission performance according to the present invention.

Referring to FIG. 6, a flow chart of a preferred method 600 of measuring transmission performance will be discussed and described. Given the extensive description above much of the discussion of FIG. 6 will be in the nature of a review and thus at a relatively high level. The method 600 is one of measuring transmission performance for a signal emanating from an antenna and begins at 603 with receiving signals in successive time intervals and at 605 providing corresponding respective successive channel metrics, such as array weights or channel phase measurements and so on. At 607 a relative channel metric corresponding to the successive channel metrics is assessed. The relative channel metric is indicative of the transmission performance of a transmission mode. Preferably assessing the relative metric includes one of assessing a phase difference between channels emanating from the antenna, determining array weights for successive time intervals and some notion of relative changes thereto, or adaptive array weights versus an alternative transmission mode, such as using an antenna as a non-adaptive array, or a single transmit antenna or a multiple input multiple output antenna or a metric corresponding to different numbers of information bits in successive time intervals.

At step 609 the relative channel metric is compared to a threshold. If not satisfied the process returns to step 603. If the threshold is satisfied the branch labeled Y is followed to step 613. Note the comparison step is optional in that the path 611 can be followed to bypass step 609. Generally the comparison will be done at the point or location where a decision regarding what transmission mode to use is to be made. When the comparison is favorable typically the transmission mode will be changed (for example from open loop to closed loop diversity or vice a versa). When that happens or when the decision is made elsewhere sending an information signal corresponding to the transmission mode is appropriate and undertaken. The procedure at 613 denotes sending an information signal corresponding to the transmission mode, such as successive channel metrics when the optional path 611 is followed and an indication of a chosen transmission mode if the process at 609 is followed. At optional 615 a control signal is received that corresponds to another transmission mode selected according to the transmission performance. The control signal, preferably, includes a predetermined component such as a pilot signal adjusted in a predetermined manner such as doubling the power of the signal for a time interval. After 615 the process continues from 603.

Figure 7:
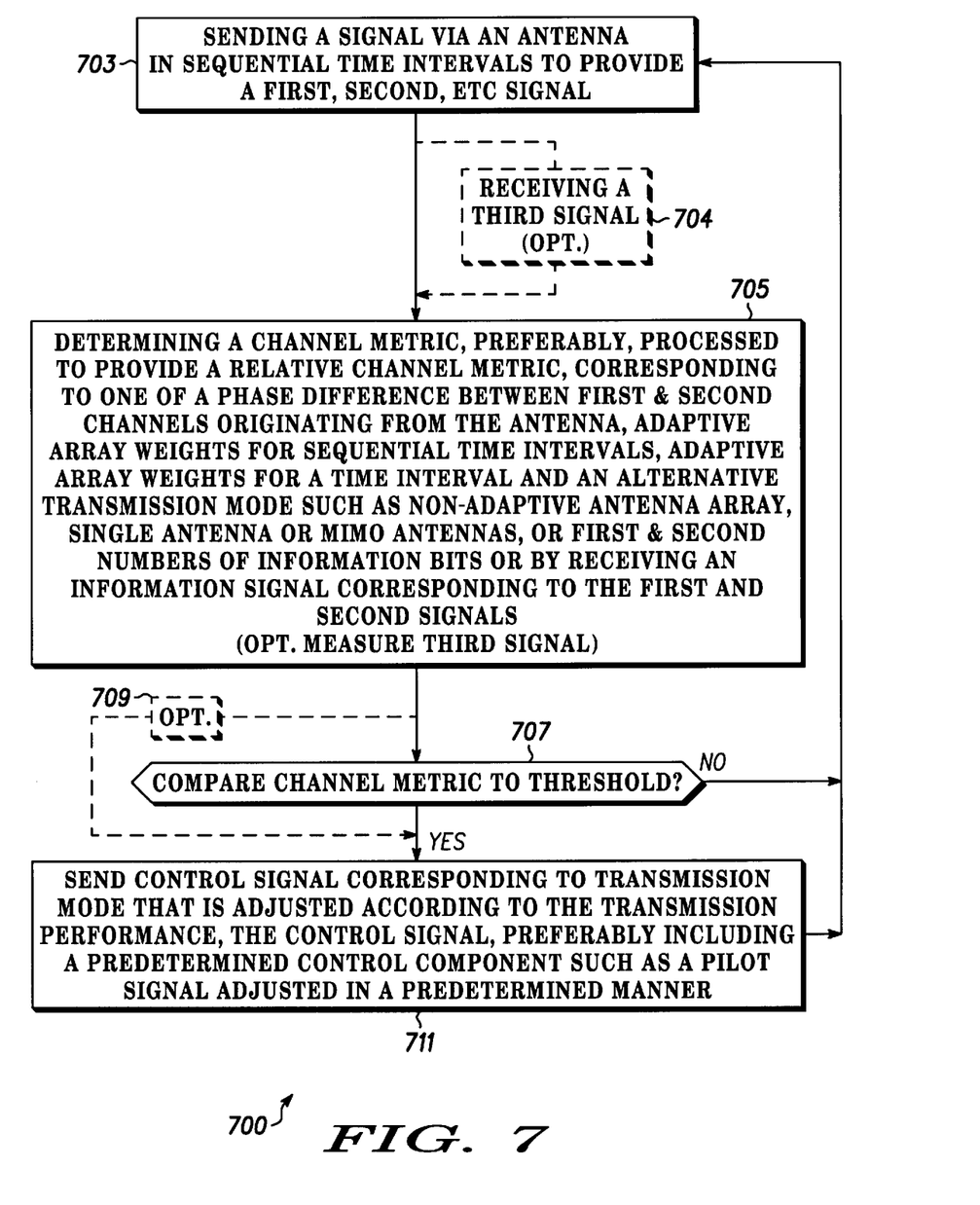
FIG. 7 depicts a flow chart of a preferred method of adjusting a transmission mode according to the present invention.

Referring to FIG. 7, a flow chart of a method of adjusting a transmission mode will be discussed and described. Again, in view of the discussion above, the description of FIG. 7 will be more of an overview and summary. FIG. 7 depicts a method 700 of adjusting a transmission mode, such as open or closed loop diversity, or varying coding and modulation schemes, based on measured transmission performance for a signal emanating from an antenna. The method begins at 703 by sending the signal in a first time interval and in a second time interval to provide, respectively, a first signal, a second signal, etc. Optionally, 704 shows receiving a third signal that as discussed above should be chosen or selected to have channel induced properties or statistics that correlate to the outbound channel properties for the first and second signal. For example this would be a signal received from the wireless communications unit that the first etc. signal was sent to at or very near the time the signal was sent.

After 703 or optional 704, 705 shows determining a channel metric corresponding to the first second and etc signals, the channel metric indicative of the transmission performance of the transmission mode used for the first etc signals. The channel metrics are preferably processed to provide a relative channel metric that corresponds to one of: an assessment of a phase difference between a first and second channel emanating from the antenna; or to adaptive array weights for the first and second time interval; or to adaptive array weights for the first time interval and an alternative transmission mode, such as operating as one of a non-adaptive transmit antenna array, a single antenna, or a multiple input multiple output antenna for the subsequent time interval; or to a number of information bits within the first and second time interval; or to an information signal regarding the first and second signal; or optionally parameters resulting from measuring the third signal from 704.

After 705 at 707 the channel metric or preferably relative channel metric is compared to a threshold to provide a comparison. If the comparison does not satisfy the threshold the process returns to 703 and if the threshold is satisfied or optional path 709 (bypassing the comparison) is taken, then 711 send a control signal corresponding to the transmission mode wherein the transmission mode is adjusted according to the transmission performance. The control signal preferably includes a signal with a predetermined control component, such as a pilot signal with a known parameter such as power adjusted in a predetermined manner. After 711 the process return s to 703 and continues.

It will be obvious that many variations lie between the two disperate examples generally represented by FIG. 2 and FIG. 3 versus FIG. 4 and FIG. 5. Generally a signal with known or discoverable predetermined characteristics must be introduced to a channel, recovered from and as altered by the channel, determine or measure the extent of the alteration or changes to the signal induced by the channel or a rate of change of such alterations or changes thus changes in the channel characteristics, select a transmission mode that is compatible or most compatible with the observed channel and make sure both the sending and receiving units are aware of or can determine the proper transmission mode. Many or most of these functions can be performed in some suitable form or other at either the subscriber unit or base transmitter in many systems. The preferred approach for most systems designers is likely to be one that optimizes overall economics or at least matches costs and benefits. One anticipates that may often lead to minimizing the functionality placed at the subscriber device.

This disclosure is intended to explain how to fashion and use various embodiments in accordance with the invention rather than to limit the true, intended, and fair scope and spirit thereof The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of measuring transmission performance for a signal emanating from an antenna, the method including:
   receiving the signal in a first time interval and in a second time interval to provide, respectively, a first channel metric and a second channel metric;
   assessing a relative channel metric corresponding to said first channel metric and said second channel metric, said relative channel metric indicative of the transmission performance of a transmission mode wherein the transmission mode is one of a plurality of transmission modes; and
   sending an information signal corresponding to said relative channel metric and receiving a control signal with a predetermined control component, said control signal including a pilot signal adjusted in a predetermined manner.

2. The method of claim 1 further including comparing said relative channel metric to a threshold to provide a comparison and, responsive to said comparison, sending said information signal further corresponding to said transmission mode.

3. The method of claim 1 wherein said receiving said control signal further comprises receiving a control signal corresponding to another transmission mode wherein said another transmission mode is selected according to the transmission performance.

4. The method of claim 1 wherein said assessing said relative channel metric further includes assessing a phase difference between a first and a second channel emanating from a first and a second element of the antenna.

5. The method of claim 1 wherein said assessing said relative channel metric further includes determining a first and a second adaptive array weights for, respectively, said first time interval and said second time interval.

6. The method of claim 1 wherein said relative channel metric further includes determining a metric corresponding to a number of information bits within said first time interval.

7. The method of claim 6 wherein said relative channel metric further includes determining a metric corresponding to said number of information bits and a second number of information bits.

8. The method of claim 1 further including sending an information signal corresponding to said first channel metric.

9. A method of measuring transmission performance for a signal emanating from an antenna, the method including:
   receiving the signal in a first time interval and in a second time interval to provide, respectively, a first channel metric and a second channel metric; and
   assessing a relative channel metric corresponding to said first channel metric and said second channel metric, said relative channel metric indicative of the transmission performance of a transmission mode wherein the transmission mode is one of a plurality of transmission modes, wherein said assessing said relative channel metric further includes determining a metric corresponding to adaptive array weights for said first time interval and an alternative transmission mode.

10. The method of claim 9 wherein said alternative transmission mode includes operating as one of a non-adaptive transmit antenna array, a single transmit antenna, and a multiple input multiple output antenna.

11. The method of claim 9 wherein said relative channel metric further includes determining a metric corresponding to a number of information bits within said first time interval.

12. The method of claim 11 wherein said relative channel metric further includes determining a metric corresponding to said number of information bits and a second number of information bits.

13. A method of adjusting a transmission mode based on measured transmission performance for a signal emanating from an antenna, the method including:
sending the signal in a first time interval and in a second time interval to provide, respectively, a first signal and a second signal;
determining a channel metric corresponding to said first signal and said second signal, said channel metric indicative of the transmission performance;
sending a control signal corresponding to the transmission mode wherein the transmission mode is adjusted according to the transmission performance, said control signal further comprising a predetermined control component included in a pilot signal adjusted in a predetermined manner.

14. The method of claim 13 further including processing said channel metric to provide a relative channel metric, comparing said relative channel metric to a threshold to provide a comparison and, responsive to said comparison, sending said control signal corresponding to said transmission mode.

15. The method of claim 13 wherein said channel metric is a relative channel metric corresponding to an assessment of a phase difference between a first and a second channel emanating from the antenna.

16. The method of claim 13 wherein said channel metric corresponds to adaptive array weights for said first time interval and said second time interval.

17. The method of claim 13 wherein said channel metric further corresponds to a number of information bits within said first time interval.

18. The method of claim 17 wherein said channel metric further corresponds to said number of information bits and a second number of information bits.

19. The method of claim 13 wherein said determining said channel metric includes receiving an information signal corresponding to said first signal and said second signal.

20. The method of claim 13 wherein said determining said channel metric further includes receiving a third signal and measuring said third signal.

21. A method of adjusting a transmission mode based on measured transmission performance for a signal emanating from an antenna, the method including:
sending the signal in a first time interval and in a second time interval to provide, respectively, a first signal and a second signal;
determining a channel metric corresponding to said first signal and said second signal, said channel metric indicative of the transmission performance, wherein said channel metric further corresponds to adaptive array weights for said first time interval and an alternative transmission mode; and
sending a control signal corresponding to the transmission mode wherein the transmission mode is adjusted according to the transmission performance.

22. The method of claim 21 wherein said alternative transmission mode further includes operating as one of a non-adaptive transmit antenna array, a single antenna, and a multiple input multiple output antenna.

23. The method of claim 21 wherein said channel metric further corresponds to a number of information bits within said first time interval.

24. The method of claim 23 wherein said channel metric further corresponds to said number of information bits and a second number of information bits.

25. A wireless communications unit adapted for measuring transmission performance for a signal emanating from an antenna, the wireless communications unit comprising in combination:
a receiver for receiving the signal in a first time interval and in a second time interval to provide, respectively, a first signal and a second signal; and
a channel processor for assessing a relative channel metric corresponding to said first signal and said second signal, said relative channel metric indicative of the transmission performance of a transmission mode, wherein the transmission mode is one of a plurality of transmission modes and the relative channel metric corresponds to adaptive array weights for said first time interval and an alternative transmission mode.

26. The wireless communications unit of claim 25 wherein said channel processor further compares said relative channel metric to a threshold to provide a comparison and, said wireless communications unit further includes a transmitter for sending, responsive to said comparison, an information signal corresponding to said transmission mode.

27. The wireless communications unit of claim 25 further including a transmitter for sending an information signal corresponding to said relative channel metric and wherein said receiver further receives a control signal corresponding to another transmission mode wherein said another transmission mode is adjusted according to the transmission performance.

28. The wireless communications unit of claim 25 wherein said channel processor assesses a phase difference between a first and a second channel emanating from a first and a second element of the antenna.

29. A base transmitter arranged and adapted for adjusting a transmission mode based on measured transmission performance for a signal emanating from an antenna, the base transmitter comprising in combination:
a transmitter for sending the signal in a first time interval and in a second time interval to provide, respectively, a first signal and a second signal;
a base channel processor for determining a channel metric corresponding to said first signal and said second signal, said channel metric indicative of the transmission performance and corresponding to adaptive array weights for said first time interval and an alternative transmission mode; and
said transmitter further for sending a control signal corresponding to the transmission mode wherein the transmission mode is adjusted according to the transmission performance.

30. The base transmitter of claim 29 further including a receiver for receiving an information signal corresponding to said first signal and said second signal and wherein said base channel processor further determines a relative channel metric based on said information signal, compares said relative channel metric to a threshold to provide a comparison and said transmitter, responsive to said comparison, sends said control signal corresponding to said transmission mode.

31. The base transmitter of claim 29 wherein said transmitter further sends said control signal including a signal with a predetermined control component adjusted in a predetermined manner.

32. The base transmitter of claim 29 wherein said base channel processor determines said channel metric corresponding to a phase difference between a first and a second channel emanating from the antenna.

* * * * *